United States Patent Office 3,449,344
Patented June 10, 1969

3,449,344
4 - AMINO - 2 - ARYL - 6 - CARBAMOYL - 7,8 - DI-
HYDRO - 7 - OXO - 8 - PTERIDINEACETAMIDES
AND 4 - AMINO - 2 - ARYL - 6 - CARBAMOYL-
7,8 - DIHYDRO - 7 - OXO - 8 - PTERIDINEACETIC
ACID ESTERS
Arthur A. Santilli, Havertown, Pa., assignor to American
Home Products Corporation, New York, N.Y., a corporation of Delaware
No Drawing. Filed Aug. 25, 1966, Ser. No. 574,915
Int. Cl. C07d 57/28; A61k 27/00
U.S. Cl. 260—251.5                                10 Claims

ABSTRACT OF THE DISCLOSURE

4 - amino - 2 - aryl - 6 - carbamoyl - 7,8 - dihydro - 7-oxo-8-pteridinecarboxamides (II) and 4-amino-2-aryl-6-carbamoyl-7,8-dihydro-7-oxo-8-pteridineacetic acid esters (I), optionally substituted on the aryl group with trifluoromethyl, halogen, alkyl or alkoxy, are provided, respectively, by alkylating the corresponding pteridinecarboxamides with a haloamide or a haloester. Compounds I and II are pharmacologically active as anti-inflammatory agents.

---

This invention relates to new and novel pteridineacetamides and pteridineacetic acid esters. In particular, the present invention is concerned with 4-amino-2-aryl-6-carbamoyl-7,8-dihydro-7-oxo-8-pteridineacetamides and 4-amino - 2 - aryl - 6 - carbamoyl - 7,8 - dihydro - 7 - oxo-8-pteridineacetic acid esters having pharmacological activity.

The new and novel compounds included within the scope of the present invention are represented by the following formulae:

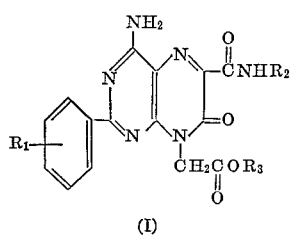

(I)

and

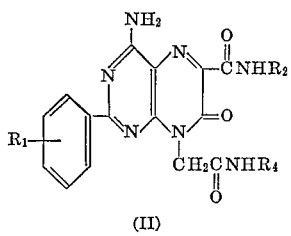

(II)

wherein $R_1$ is selected from the group consisting of hydrogen, trifluoromethyl, halogen, lower alkyl and lower alkoxy; $R_2$ is selected from the group consisting of hydrogen, lower alkyl, lower alkoxy(lower)alkyl and lower alkylthio(lower)alkyl; $R_3$ is lower alkyl and $R_4$ is selected from the group consisting of cyclo(lower)alkyl, phenyl, lower alkylphenyl, lower alkoxyphenyl, halophenyl, lower alkyl and lower alkoxy(lower)alkyl.

The new compounds represented by structural Formula I are called: "pteridineacetamides." Typical examples thereof are: 4-amino-N-cycloheptyl-7,8-dihydro-6-(2-methoxyethylcarbamoyl) - 7 - oxo - 2 - phenyl - 8 - pteridineacetamide; 4 - amino - N - (4-chlorophenyl) - 7,8-dihydro- 6 - (2-methoxyethylcarbamoyl) - 7 - oxo - 2-phenyl-8-pteridineacetamide; and 4-amino-7,8-dihydro-N-(4-iodophenyl) - 6 - (2-methoxyethylcarbamoyl) - 7-oxo-2-phenyl-8-pteridineacetamide. Alternatively, when the new compounds are depicted by structural Formula II, they are named: "pteridineacetic acid, esters," such as: 4-amino - 7,8 - dihydro - 6 - (2-methoxyethylcarbamoyl)-7-oxo-2-phenyl-8-pteridineacetic acid, ethyl ester; 4-amino-6 - carbamoyl - 7,8 - dihydro - 2 - (4-methoxyphenyl)-7-oxo-8-pteridineacetic acid, ethyl ester; and 4-amino-7,8-dihydro - 6 - (4-methylthiobutylcarbamoyl) - 7 - oxo - 2-phenyl-8-pteridineacetic acid, butyl ester.

The novel pteridineacetic acid esters of the present invention may be prepared by the hereinafter depicted reaction:

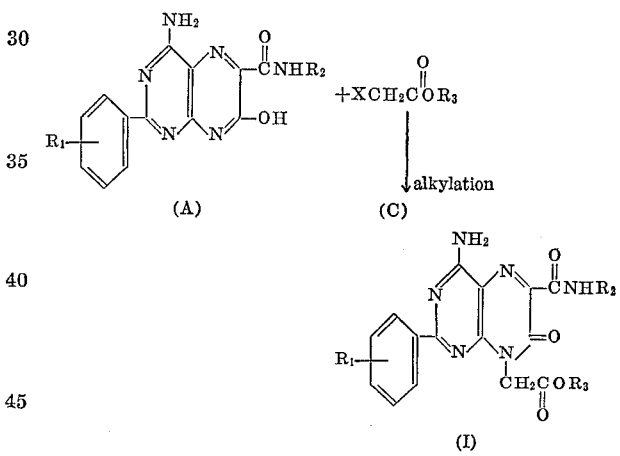

wherein $R_1$, $R_2$ and $R_3$ are defined as above and X is halogen. The reaction is conducted by admixing a pteridinecarboxamide (A) in an alkanol, in the presence of an alkaline alkylating agent and heating the resulting mixture at a temperature from about 60° C. to about 100° C. for about one to four hours. Thereafter, an alkyl haloacetate (C) is added thereto and the reaction-mixture is heated for a period from about one to about forty-eight hours at a temperature range from about 60° C. to about 100° C. Preferably, this reaction is conducted by refluxing a pteridinecarboxamide (A) in ethanol, in the presence of sodium, for about one hour and thereafter, adding an alkyl haloacetate (C) thereto. The resulting mixture is then refluxed for about three hours.

When the reaction is complete, the product is obtained by conventional methods, such as, filtration, precipitation and recrystallization from a suitable solvent, such as an alkanol.

The novel pteridineacetamides of the present invention may be prepared by the following schematic reaction sequence:

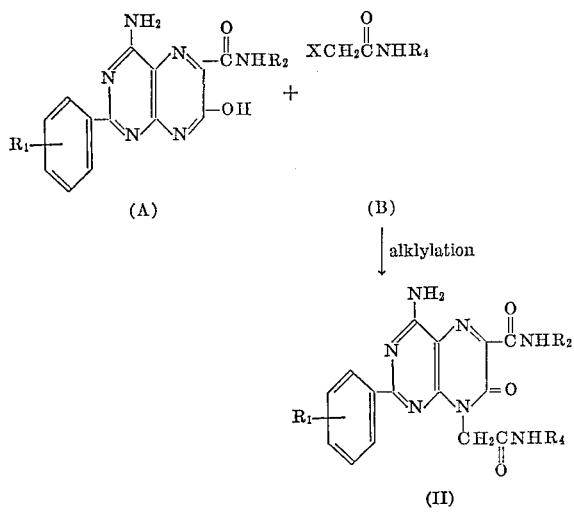

wherein $R_1$, $R_2$ and $R_4$ are defined as above and X is halogen. The reaction may be effected by heating a substantially eequimolar aqueous mixture of a pteridinecarboxamide (A) and a haloamide (B), in the presence of alkaline alkylating agent, at a temperature range from about 60° C. to about 100° C. for a period of about one to forty-eight hours. Preferably, this reaction is conducted in an aqueous sodium hydroxide solution at reflux temperatures for about three hours.

After the reaction period, the reaction mixture is cooled and the precipitated product is separated by filtration or decantation. The product may be further purified by conventional means, such as recrystallization. Preferred solvents for this purpose are alkanols, and glycol ethers.

The time and temperature ranges utilized in the above mentioned reactions are not critical and simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time. By alkaline alkylating agent is meant an alkaline reagent such as an alkali metal or the hydroxide of an alkali metal. Other obviously equivalent reagents will readily suggest themselves to one skilled in the art of chemistry. The amount of solvent used is not critical, it being only necessary to use sufficient solvent to provide a reaction medium for the reactants.

The pteridinecarboxamides which are utilized as starting materials in the preparation of the compounds of the present invention are known compounds which are prepared by the method described in co-pending U.S. patent application, Ser. No. 519,212, filed on Jan. 7, 1966. The majority of the haloamides (B) and the alkyl haloacetates (C) employed in the aforesaid processes are known compounds which are readily available from commercial sources, while the remainder can either be prepared in accordance with standard organic procedures well known to those skilled in the art or by known published procedures.

In accord with the present invention, the pteridineacetamides and the pteridineacetic acid esters herein described have been found to possess interesting pharmaceutical properties which render them useful as synthetic medicinals. More particularly, these compounds, in standard pharmacological tests, have exhibited utility as anti-inflammatory agents.

When the compounds of this invention are employed as anti-inflammatory agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 50 mg. to about 1000 mg. per day, although as aforementioned variations will occur. However, a dosage level that is in the range of from about 200 mg. to about 600 mg. per day is most desirably employed in order to achieve effective results.

The following examples are given by way of illustration and are not to be construed as limitations of this invention, many variations of which are possible without departing from the scope and spirit thereof.

Example I

To 500 ml. of dry benzene, there is added 11.3 g. of cycloheptyl amine and 10.1 g. of triethyl amine. The reaction mixture is cooled and 11.3 g. of chloroacetyl chloride added dropwise to the amine solution with stirring, at ice-bath temperature. After addition is complete, the reaction mixture is allowed to stir at room temperature for fifty minutes and is then filtered under suction. In this manner, there is obtained 13.4 g. of a water soluble salt which is discarded. The filtrate is taken to dryness in a rotary evaporator and an oily residue crystallizes on cooling to afford 19.6 g. of product, M.P. 61–64° C. Recrystallization from cyclohexane yields 2-chloro-N-cycloheptylacetamide, M.P. 69.5–72° C.

*Analysis.*—Calcd. for $C_9H_{16}ClNO$: C, 56.98; H, 8.50; N, 7.38; Cl, 18.69. Found: C, 56.79; H, 8.18; N, 7.35; Cl, 19.0.

4 - amino - 7 - hydroxy - N - (2 - methoxyethyl) - 2-phenyl-6-pteridinecarboxamide (3.4 g.) is dissolved in 500 ml. of water into which has been added 0.4 g. of sodium hydroxide. To the reaction mixture there is added 1.89 g. of 2-chloro-N-cycloheptyl acetamide. The reaction mixture is heated under reflux with stirring for three hours and then filtered under suction. Recrystallization of the crude product from ethanol affords 2.7 g. of 4-amino- N - cycloheptyl - 7,8 - dihydro - 6 - (2-methoxyethylcarbamoyl)-7-oxo-2-phenyl-8-pteridineacetamide, M.P. 291–292° C.

*Analysis.*—Calcd. for $C_{25}H_{31}N_7O_4$: C, 60.84; H, 6.33; N, 19.87. Found: C, 60.46; H, 6.37; N, 19.57.

Example II

4 - amino - 7 - hydroxy - N - (2 - methoxyethyl) - 2-phenyl-6-pteridinecarboxamide (3.4 g.) is dissolved in 500 ml. of water into which has been dissolved 0.4 g. of sodium hydroxide. To the reaction mixture there is added 2.0 g. of 2-chloro-4'-chloroacetanilide. The reaction mixture is heated under reflux with stirring for four hours and then filtered to afford 2.0 g. of material, M.P. 295–298° C. Recrystallization of the crude product from ethanol-N,N-dimethylformamide affords 1.2 g. of 4-amino - N - (4-chlorophenyl) - 7,8 - dihydro - 6 - (2-methoxyethylcarbamoyl) - 7-oxo-2-phenyl-8-pteridineacetamide, M.P. 303–305° C.

*Analysis.*—Calcd. for $C_{24}H_{22}ClO_4N_7$: C, 56.75; H, 4.37; N, 19.30; Cl, 6.98. Found: C, 56.87; H, 4.39; N, 19.49; Cl, 6.9.

Example III

The procedure of Examples I and II is repeated reacting the hereinafter listed pteridinecarboxamides and haloamides to yield the following products:

| Starting material | Products |
| --- | --- |
| 4-amino-2-(4-chlorophenyl)-N-(2-ethylthioethyl)-7-hydroxy-6-pteridinecarboxamide and 2-chloro-N-cyclohexyl acetamide. | 4-amino-2-(4-chlorophenyl)-N-cyclohexyl-6-(2-ethylthioethylcarbamoyl)-7,8-dihydro-7-oxo-8-pteridineacetamide. |
| 4-amino-7-hydroxy-2-(4-methoxyphenyl)-6-pteridinecarboxamide and 2-chloro-4'-bromoacetanilide. | 4-amino-N-(4-bromophenyl)-6-carbamoyl-7,8-dihydro-2-(4-methoxypenyl)-7-oxo-8-pteridineacetamide. |
| 4-amino-N-ethyl-2-(3-trifluoromethylphenyl)-7-hydroxy-6-pteridinecarboxamide and 2-bromo-N-cyclopropyl acetamide. | 4-amino-6-ethylcarbamoyl-2-(3-trifluoromethylphenyl)-7,8-dihydro-7-oxo-N-cyclopropyl-8-pteridineacetamide. |
| 4-amino-2-(4-bromophenyl)-N-butyl-7-hydroxy-6-pteridinecarboxamide and 2-chloro-N-cyclopentyl acetamide. | 4-amino-2-(4-bromophenyl)-6-butylcarbamoyl-7,8-dihydro-7-oxo-N-cyclopentyl-8-pteridineacetamide. |
| 4-amino-N-(2-ethoxyethyl)-7-hydroxy-2-phenyl-6-pteridinecarboxamide and 2-bromo-acetanilide. | 4-amino-6-(2-ethoxyethylcarbamoyl)-7,8-dihydro-7-oxo-2-N-diphenyl-8-pteridineacetamide. |
| 4-amino-N-(2-ethoxyethyl)-7-hydroxy-2-(4-propylphenyl)-6-pteridinecarboxamide and 2-chloro-N-methylacetamide. | 4-amino-6-(2-ethoxyethylcarbamoyl)-7,8-dihydro-N-methyl-7-oxo-2-(4-propylphenyl)-8-pteridineacetamide. |
| 4-amino-7-hydroxy-N-methyl-2-phenyl-6-pteridinecarboxamide and 2,4'-dichloroacetanilide. | 4-amino-N-(4-chlorophenyl)-7,8-dihydro-6-methylcarbamoyl-7-oxo-2-phenyl-8-pteridineacetamide. |

Example IV

4 - amino - 7 - hydroxy - N - (2 - methoxyethyl) - 2-phenyl-6-pteridinecarboxamide (7.0 g.) is dissolved in 1000 ml. of water containing 0.8 g. of potassium hydroxide. To the above solution there is added 4.0 g. of 2-chloro-4'-iodoacetanilide. The reaction mixture is then heated to 60° C. with stirring for forty-eight hours and filtered. The crude product is recrystallized from methanol-N,N-dimethylformamide to afford 4-amino-7,8-dihydro-N-(4-iodophenyl) - 6 - (2 - methoxyethylcarbamoyl) - 7 - oxo-2-phenyl-8-pteridineacetamide.

In a similar manner, 4-amino-N-(2-butoxyethyl)-7-hydroxy-2-phenyl-6-pteridinecarboxamide is reacted with 2-bromo-3'-fluoroacetanilide to yield 4-amino-6-(2-butoxyethylcarbamoyl) - N - (3 - fluorophenyl) - 6,7 - dihydro-7-oxo-2-phenyl-8-pteridineacetamide.

Example V

4 - amino - 7 - hydroxy - N - (4 - methylthiobutyl) - 2-phenyl-6-pteridinecarboxamined (2.0 g.) is dissolved in 250 ml. of water containing 0.2 g. of sodium hydroxide. To the above solution there is added 1.0 g. of 2-chloro-N-cyclopropyl acetamide. The reaction mixture is then heated to reflux with stirring for five hours and filtered. The crude product is recrystallized from propanol to afford 4 - amino - 7,8 - dihydro - 6 - (4 - methylthiobutylcarbamoyl) -7 - oxo - 2 - phenyl - N - cyclopropyl - 8-pteridineacetamide.

Similarly 4 - amino - N - cyclobutyl - 7,8 - dihydro - 6-(4 - methylthiobutylcarbamoyl) - 7 - oxo - 2 - phenyl - 8-pteridineacetamide and 4-amino-7,8-dihydro-6-methylcarbamoyl - N - cyclooctyl - 7 - oxo - 2 - phenyl - 8 - pteridineacetamide are synthesized.

Example VI

4 - amino - 2 - (4 - fluorophenyl) - 7 - hydroxy - 6-pteridinecarboxamide (3.5 g.) is dissolved in 500 ml. of water containing 0.4 g. of potassium hydroxide. To the above solution there is added 2.0 g. of 2-bromo-N-ethyl acetamide. The reaction mixture is then heated to reflux with stirring for five hours and filtered. The crude product is recrystallized from Cellosolve to afford 4-amino-6-carbamoyl - N - ethyl - 2 - (4 - fluorophenyl) - 7,8 - dihydro-7-oxo-8-pteridineacetamide.

In a similar manner, the following pteridineacetamides are produced:

4-amino-6-carbamoyl-7,8-dihydro-2-(2-iodophenyl)-N-methoxymethyl-7-oxo-8-pteridineacetamide;

4-amino-6-carbamoyl-7,8-dihydro-7-oxo-N-pentyl-2-(4-propoxyphenyl)-8-pteridineacetamide; and 4-amino-6-carbamoyl-2-(4-hexylphenyl)-7,8-dihydro-7-oxo-N-(4-tolyl)-8-pteridineacetamide.

Example VII

4 - amino - 7 - hydroxy - N - (6 - methylthiohexyl) - 2-phenyl-6-pteridinecarboxamide (10.5 g.) is dissolved in 1500 ml. of water containing 0.6 g. of sodium hydroxide. To the above solution there is added 6.0 g. of 2-chloro-4'-ethylacetanilide. The reaction mixture is then heated to reflux with stirring for seven hours and filtered. The crude product is recrystallized from methanol-dimethylformamide to yield 4-amino-N-(4-ethylphenyl)-7,8-dihydro - 6 - (6 - methylthiohexylcarbamoyl) - 7 - oxo - 2-phenyl-8-pteridineacetamide.

Example VIII

Repeating the procedure of the prior examples to react an appropriate pteridinecarboxamide with a haloamide, the hereinafter listed pteridineacetamides are obtained:

4-amino-N-(4-butylphenyl)-6-carbomyl-7,8-dihydro-7-oxo-2-(4-tolyl)-8-pteridineacetamide;

4-amino-N-butyl-6-carbamoyl-2-(3-ethylphenyl)-7,8-dihydro-7-oxo-8-pteridineacetamide;

4-amino-2-(4-butoxyphenyl)-6-carbamoyl-N-ethoxymethyl-7,8-dihydro-7-oxo-8-pteridineacetamide;

4-amino-N-(2-butoxyethyl)-7,8-dihydro-6-(4-methylthiobutylcarbamoyl)-7-oxo-2-phenyl-8-pteridineacetamide;

4-amino-6-(2-ethoxyethylcarbamoyl)-7,8-dihydro-7-oxo-N-(4-methoxyphenyl)-2-phenyl-8-pteridineacetamide; and 4-amino-2-(4-chlorophenyl)-7,8-dihydro-7-oxo-N-(4-propoxyphenyl)-6-propylcarbamoyl-8-pteridineacetamide.

Example IX 4-amino-7-hydroxy - N - (2-methoxyethyl)-2-phenyl-6-pteridinecarboxamide (6.8 g.) is added to a solution of 0.5 g. of sodium in 250 ml. of ethanol. The mixture is heated under reflux with stirring for one hour and methyl bromoacetate (3.1 g.) is added thereto. The reaction mixture is then heated for four hours and filtered. On cooling the filtrate, there is obtained 5.3 g. of product, M.P. 212–214° C. Recrystallization from ethanol affords 4.0 g. of 4 - amino-7,8-dihydro-6-(2-methoxyethylcarbamoyl)-7-oxo-2-phenyl - 8 - pteridineacetic acid, ethyl ester, M.P. 214.5–216.5° C.

*Analysis.*—Calcd. for $C_{20}H_{22}O_5N_6$: C, 56.33; H, 5.20; N, 19.71. Found: C, 56.39; H, 5.24; N, 19.47.

Similarly, reacting 4-amino-2-(4-chlorophenyl)-N-(2-ethylthioethyl)-7-hydroxy - 6 - pteridinecarboxamide with methylbromoacetate yields 4-amino-2-(4-chlorophenyl)-6-(2-ethylthioethylcarbamoyl) - 7,8 - dihydro-7-oxo-8-pteridineacetic acid, methyl ester.

Example X

4 - amino-7-hydroxy-2-(4-methoxyphenyl)-6-pteridinecarboxamide (14.0 g.) is added to a solution of 1.0 g. of potassium in 500 ml. of methanol. The mixture is heated at 65° C. with stirring for two hours and admixed with ethylchloroacetate (6.5 g.). The resulting mixture is then heated for seven hours and filtered. Upon cooling the filtrate, there is obtained a crude product which when recrystallized from ethanol affords 4-amino-6-carbamoyl-7,8 - dihydro - 2 - (4 - methoxyphenyl) - 7 - oxo - 8 - pteridineacetic acid, ethyl ester.

Example XI 4-amino-7-hydroxy-N-(4-methylthiobutyl) - 2 - phenyl-6-pteridinecarboxamide (7.0 g.) is added to a solution of 0.5 g. of sodium in 250 ml. of ethanol. The mixture is heated at 55° C. with stirring for three hours and admixed with butyl chloroacetate (3.2 g.). The resulting mixture is then heated for six hours and filtered. Upon cooling the filtrate, there is obtained a crude product which when recrystallized from butanol affords 4-amino-7,8 - dihydro - 6 - (4 - methylthiobutylcarbamoyl)-7-oxo-2-phenyl-8-pteridineacetic acid, butyl ester.

Example XII

The procedure of Examples IX to XI is repeated, reacting the hereinafter listed pteridinecarboxamides and alkylhaloacetates to obtain the following pteridineacetic acid esters:

| Starting material | Products |
|---|---|
| 4-amino-2-(4-bromophenyl)-N-butyl-7-hydroxy-6-pteridine-carboxamide and propylbromoacetate. | 4-amino-2-(4-bromophenyl)-6-butylcarbamoyl-7,8-dihydro-7-oxo-8-pteridine-acetic acid, propyl ester. |
| 4-amino-7-hydroxy-N-methyl-2-phenyl-6-pteridinecarboxamide and methyl chloroacetate. | 4-amino-7,8-dihydro-6-methylcarbamoyl-7-oxo-2-phenyl-8-pteridineacetic acid, methyl ester. |
| 4-amino-N-(2-butoxyethyl)-7-hydroxy-2-phenyl-6-pteridine-carboxamide and hexyl chloroacetate. | 4-amino-6-(2-butoxyethyl-carbamoyl)-7,8-dihydro-7-oxo-2-phenyl-8-pteridine-acetic acid, hexyl ester. |
| 4-amino-7-hydroxy-N-(6-methylthiohexyl)-2-phenyl-6-pteridine-carboxamide and butyl chloroacetate. | 4-amino-7,8-dihydro-7-oxo-6-(6-methylthiohexylcarbamoyl)-2-phenyl-6-pteridine-acetic acid, butyl ester. |

Example XIII 4-amino-N-(2-ethoxyethyl)-7-hydroxy - 2 - phenyl-6-pteridinecarboxamide (7.0 g.) is added to a solution of 0.5 g. of sodium in 250 ml. of ethanol. The mixture is heated at reflux with stirring for one hour and admixed with ethyl chloroacetate (3.0 g.). The resulting mixture is then heated for four hours and filtered. Upon cooling the filtrate, there is obtained a crude product which when recrystallized from ethanol affords 4-amino-6-(2-ethoxyethylcarbamoyl) - 7,8 - dihydro - 7 - oxo - 2 - phenyl-8-pteridineacetic acid, ethyl ester.

What is claimed is:
1. A compound selected from the group consisting of those having the formulae:

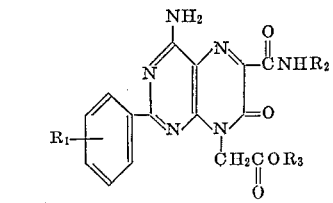

and

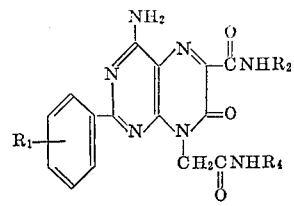

wherein $R_1$ is selected from the group consisting of hydrogen, trifluoromethyl, halogen, lower alkyl and lower alkoxy; $R_2$ is selected from the group consisting of hydrogen, lower alkyl, lower alkoxy(lower)alkyl and lower alkylthio(lower)alkyl; $R_3$ is lower alkyl and $R_4$ is selected from the group consisting of cyclo(lower)alkyl, phenyl, lower alkylphenyl, lower alkoxyphenyl, halophenyl, lower alkyl and lower alkoxy(lower)alkyl.

2. 4 - amino - N - cycloheptyl - 7,8 - dihydro-6-(2-methoxyethylcarbamoyl) - 7 - oxo - 2 - phenyl-8-pteridineacetamide.

3. 4 - amino - N - (4 - chlorophenyl) - 7,8-dihydro-6-(2-methoxyethylcarbamoyl) - 7 - oxo - 2 - phenyl-8-pteridineacetamide.

4. 4 - amino - 7,8 - dihydro - N - (4 - iodophenyl)-6-(2-methoxyethylcarbamoyl) - 7 - oxo-2-phenyl-8-pteridineacetamide.

5. 4 - amino - 7,8 - dihydro - 6 - (4-methylthiobutylcarbamoyl) - 7 - oxo-2-phenyl-N-cyclopropyl-8-pteridineacetamide.

6. 4-amino - N - butyl-6-carbamoyl-2-(3-ethylphenyl)-7,8-dihydro-7-oxo-8-pteridineacetamide.

7. 4 - amino - 7,8 - dihydro-6-(2-methoxyethylcarbamoyl) - 7 - oxo-2-phenyl-8-pteridineacetic acid, ethyl ester.

8. 4-amino - 6 - carbamoyl-7,8-dihydro-2-(4-methoxyphenyl)-7-oxo-8-pteridineacetic acid, ethyl ester.

9. 4 - amino - 7,8 - dihydro - 6 - (4-methylthiobutylcarbamoyl)-7-oxo-2-phenyl-8-pteridineacetic acid, butyl ester.

10. 4 - amino - 6 - (2 - ethoxyethylcarbamoyl)-7,8-dihydro - 7 - oxo - 2 - phenyl-8-pteridineacetic acid, ethyl ester.

References Cited

UNITED STATES PATENTS 3,294,799   12/1966   Osdene _____ 260—251.5

ALEX MAZEL, *Primary Examiner*.

R. V. RUSH, *Assistant Examiner*.

U.S. Cl. X.R.

424—251